United States Patent [19]
Soroushian et al.

[11] Patent Number: 5,643,359
[45] Date of Patent: Jul. 1, 1997

[54] DISPERSION OF PLANT PULP IN CONCRETE AND USE THEREOF

[75] Inventors: Parviz Soroushian; Jer-Wen Hsu, both of Okemos, Mich.

[73] Assignee: DPD, Inc., Lansing, Mich.

[21] Appl. No.: 558,847

[22] Filed: Nov. 15, 1995

[51] Int. Cl.$^6$ ................................................ C04B 16/02
[52] U.S. Cl. ............................................ 106/805; 106/731
[58] Field of Search ...................................... 106/731, 805

[56] References Cited

U.S. PATENT DOCUMENTS

| | | |
|---|---|---|
| 1,046,913 | 12/1912 | Weakley . |
| 1,349,901 | 8/1920 | Meischke-Smith . |
| 1,633,219 | 6/1927 | Martic . |
| 1,913,707 | 6/1933 | Etheridge . |
| 2,677,955 | 5/1954 | Constantinesco . |
| 3,753,749 | 8/1973 | Nutt ................................ 106/731 |
| 4,188,454 | 2/1980 | Foley et al. . |
| 4,263,365 | 4/1981 | Burgessard . |
| 4,287,020 | 9/1981 | Moore . |
| 4,310,478 | 1/1982 | Baalslev et al. . |
| 4,369,201 | 1/1983 | Kober . |
| 4,400,217 | 8/1983 | Kober . |
| 4,483,727 | 11/1984 | Eickman et al. . |
| 4,524,101 | 6/1985 | Eickman et al. . |
| 4,861,812 | 8/1989 | McAlpin et al. . |
| 4,968,561 | 11/1990 | Mizobe et al. . |
| 4,985,119 | 1/1991 | Vinson et al. ................. 106/731 |
| 5,000,824 | 3/1991 | Gale et al. . |
| 5,102,596 | 4/1992 | Lempfer et al. .............. 106/731 |
| 5,196,061 | 3/1993 | Thomas et al. . |
| 5,362,562 | 11/1994 | Evans et al. . |
| 5,385,978 | 1/1995 | Evans et al. . |
| 5,399,195 | 3/1995 | Hansen et al. . |
| 5,453,310 | 9/1995 | Andersen et al. . |

FOREIGN PATENT DOCUMENTS

| | | |
|---|---|---|
| 0225404 | 6/1987 | European Pat. Off. . |
| 0235577 | 9/1987 | European Pat. Off. . |
| 891945 | 3/1962 | United Kingdom . |

OTHER PUBLICATIONS

M.J. Kocurek and C.F.B. Stevent, "Pulp and Paper Manufacture – vol. 1: Properties of Fibrous Raw Materials and Their Preparation ofr Pulping," The Joint Textbook Committee of the Paper Industry, 1983, 182 pp.

P.K. Mehta and P.J.M. Monteiro, "Concrete Structure, Properties, and Materials," Prentice Hall, 1993, 548 pp.

*Primary Examiner*—David Brunsman

[57] ABSTRACT

Pulp fibers derived from wood or non-wood plants or recycled paper products, which are about 0.1–30 mm long and about 0.001–0.1 mm in diameter with length-to-diameter ratio of about 30–3000, are dispersed in conventional concrete mixtures using conventional mixing equipment for effectively improving fresh and hardened concrete properties at relatively low cost. Dispersion is achieved by individualizing the plant pulp fibers so that they are not fully bonded to each other, and dispersing the individual fibers in concrete at relatively low dosages of about 0.3–30 kg per cubic meter. Once individualized, the affinity of plant pulp fibers for water facilitates their dispersion in conventional concrete mixtures. Fresh concrete mixtures incorporating the dispersed individualized plant pulp fibers possess desirable workability, resistance to segregation and bleeding, pumpability, finishability, and reduced rebound when pneumatically applied. Hardened concrete materials incorporating the dispersed individualized plant pulp fibers provide improved crack resistance, toughness characteristics, impact resistance, fatigue life, abrasion resistance, and other mechanical, physical and durability characteristics. Precast and cast-in-pace concrete as well as plain and reinforced concrete and shotcrete benefit from such improvements in fresh and hardened material properties rendered by dispersed plant pulp fibers.

35 Claims, No Drawings

5,643,359

DISPERSION OF PLANT PULP IN CONCRETE AND USE THEREOF

BACKGROUND—FIELD OF THE INVENTION

This invention relates to brittle matrix composites and plant pulp, and especially to the processing and use of pulp for reinforcing concrete.

BACKGROUND—DESCRIPTION OF THE PRIOR ART

The concept of using fibers to improve the behavior of building materials is old; examples include adding straw fibers to sun-dried mud bricks (adobe) and asbestos fibers to pottery, thus creating a composite with a better performance. Such performance could be translated in the case of adobe by a better resistance to cracking and a better resistance to fragmentation after cracking induced by repetitive changes in temperature and humidity. It is no surprise that when Portland cement concrete started evolving as a building material, attempts were made to add fibers to it to improve its behavior. Early work in this area in the 19th century led to the development of ferrocement and reinforced concrete as known today. However, the use of continuous reinforcement requires careful placement and higher labor technical skills, hence higher cost.

The idea of using strong discontinuous fibers as reinforcement for concrete has been a challenge to many civil engineers. Adding the reinforcement to the mixer in the form of fibers, simply like adding aggregates or admixtures, to create a homogeneous, isotropic, and moldable structural material is a dream that started more than a century ago, and is still in the making today.

Two main time periods seem to characterize the pace of development of fiber reinforcement for concrete. The first period, prior to the 1960s, corresponds to a slow pioneering phase with almost no applications, while the second period, since the early 1960s, corresponds to a phase of more rapid modem developments paralleled by increasing applications. Several patents on fiber reinforced concrete have been granted. They generally address one or a combination of the following: the fiber, the fiber reinforced concrete mix, the production process, and the application. A selective number of patents and other references is reviewed next, explaining the underlying idea behind each patent and the evolution of new ideas with time. A listing of the references is first presented followed by a brief discussion of same.

U.S. PAT. DOCUMENTS

| | | |
|---|---|---|
| 1,046,913 | 12/10/1912 | R. D. Weakley |
| 1,349,901 | 8/17/1920 | W. Meischke-Smith |
| 1,633,219 | 6/21/1927 | G. C. Martic |
| 1,913,707 | 6/13/1933 | H. Etheridge |
| 2,677,955 | 5/11/1954 | G. Constatinesco |
| 4,188,454 | 2/12/1980 | K. M. Foley and H. G. Hill |
| 4,287,365 | 4/21/1981 | G. M. Burgessard and R. M. Avery Jr. |
| 4,287,020 | 9/1/1981 | L F. Moore |
| 4,310,478 | 1/12/1982 | J. Baalsley and L. O. Masen |
| 4,369,201 | 1/18/1983 | H. Kober |
| 4,400,217 | 8/23/1983 | H. Kober |
| 4,483,727 | 11/20/1984 | N. C. Eickman, W. Fabisiak and R. Dix |
| 4,524,101 | 6/18/1985 | N. C. Eickman, W. Fabisiak and R. Dix |
| 4,861,812 | 8/29/1989 | J. J. McAlpin and W. Y. Chow |
| 4,985,119 | 1/15/1991 | K. D. Vinson and B. J. L. Huff |
| 4,968,561 | 11/6/1990 | A. Mizobe, M. Okazaki, M. Mayahara and J. Yoshinaka |
| 5,000,824 | 3/19/1991 | D. M. Gale and P. G. Joseph |
| 5,196,061 | 3/23/1993 | R. C. Thomas and C. O. Thomas |
| 5,362,562 | 11/8/1994 | R. E. Evans, A. Maranci and S. S. Kaminski |
| 5,385,978 | 1/31/1995 | R. E. Evans, A. Maranci and S. S. Kaminski |
| 5,399,195 | 3/21/1995 | A. Hansen and D. Davies |
| 5,453,310 | 9/26/1995 | Andersen et al |
| FOREIGN PATENT DOCUMENTS | | |
| 891,945 | 3/1962 | United Kingdom |
| 0225404 | 6/1987 | European Patent Office |
| 0235577 | 9/1987 | European Patent Office |

Other Publications

M. J. Kocurek and C. F. B. Stevent, "Pulp and Paper Manufacture—Vol. 1: Properties of Fibrous Raw Materials and Their Preparation of Pulping." The joint Textbook Committee of the Paper Industry, 1983, 182 pp.

P. K. Mehta and P. J. M. Monteiro, "Convrete Structure, Properties, and Materials," Prentice Hall, 1993, 548 pp.

Pioneering Developments

U.S. Pat. No. 1,048,913 to R. D. Weakly (1912) covers the use of a steel wire strip made of two wires and containing loops to secure a durable bond with concrete. U.S. Pat. No. 1,349,901 to W. Meischke-Smith (1920) describes the use of flat twisted pieces of wires as fiber reinforcement for concrete mixtures. U.S. Pat. No. 1,633,219 to G. C. Manic (1927) describes the use of plain or crimped pieces of steel wires mixed with concrete to strengthen concrete pipes. The idea of improving the shape of the fiber to increase its contributions was pushed one step further in U.S. Pat. No. 1,913,707 to H. Etheridge (1933) which proposed adding "annuli" fibers of different sizes and diameters to improve the crack resistance and fatigue of concrete for use in railway ties. This patent states: "The object that I have in view is the prevention of local cracks and fracture and I accomplish such object by mixing with the plastic concrete a mass of metal annuli in sufficient quantity to effect coupling of which I may term the "stitching together" of the adjacent masses of concrete . . . " U.S. Pat. No. 2,677,955 to G. Constantinesco (1954) describes the use of coiled or helical type steel fibers in order to increase the crack resistance and energy absorption of concrete masses. Suggested applications included army tanks, air raid shelters, machinery foundations, and the like.

Modern Developments

The modern developments of fiber reinforcement for concrete started in the early 1960s. A multitude of fibers and fiber materials were introduced and are being continuously introduced in the markets as new applications are identified. These include:

Steel fibers (straight, crimped, twisted, deformed with hooked or paddled ends).

Glass fibers.

Carbon fibers.

Natural organic and mineral fibers (abaca, sisal, jute, wood, bamboo, coconut, asbestos, rockwool).

Polypropylene fibers (plain, twisted, fibrillated, with buttoned ends).

Many other synthetic fibers like kevlar, nylon, and polyester.

The following overview of the modem patents on fiber reinforced concrete first covers the key patents which outline major developments in the field, and then reviews patents which refer to the use of plant fibers in cement-based materials.

The Key Modern Patents on Fiber Reinforced Cement Composites

Glass fibers offer high levels of reinforcement efficiency in cement-based materials, but glass fiber reinforced cement composites are susceptible to deterioration under aging effects. U.S. Pat. No. 4,188,454 to K. M. Foley and H. G. Hill (1980) describes an organo silane coating for glass fibers which increases their resistance to the alkaline environment of the cement-based matrix. Further developments in this area include the production of alkali-resistant glass fibers and special processing techniques such as the spray-up method. Our invention is distinguished from such developments in the field of glass fiber to reinforced cement composites because we use: (1) plant pulp fibers (instead of glass fibers); (2) conventional mixing procedures (instead of specialized processing using, say, the spray-up technique); (3) a conventional concrete matrix which is built into conventional concrete products such as pavements, floor systems, etc. (instead of a mortar matrix with fine sand which is built into building panels); and (4) relatively low volume fraction of plant pulp fibers as secondary reinforcement for crack control and general improvements in material properties (instead of relatively high volume fractions of glass fibers which are used as primary reinforcement to increase flexural strength). Our patent also emphasizes the dispersion of plant pulp fibers in concrete using conventional mixing techniques.

U.S. Pat. No. 4,287,020 to I. F. Moore (1981) describes a method of "opening" asbestos fibers which makes them more effective as primary reinforcement at about 10% volume fraction in cement-based materials. The replacement of asbestos as primary reinforcement in thin cement products has been the subject of extensive developments with synthetic and cellulose fibers. For example, U.S. Pat. No. 5,000,824 to D. M. Gale and P. G. Joseph (1991) and British patent No. 891,945 (1962) describe an improved pulp of oriented polyethylene fibrids which is useful as primary reinforcement in thin cement products. This synthetic pulp can be refined until a specific range of sizes is obtained and is then incorporated into cement products using reinforcement at relatively low volume fractions. Our invention is distinguished from the existing technology of asbestos cement and "non-asbestos" cement because we use: (1) relatively low volume fraction of plant pulp fibers as secondary reinforcement (instead of relatively high volume fractions of asbestos, synthetic or cellulose fibers as primary reinforcement); (2) conventional concrete mixing techniques (instead of specialized, say, slurry-dewatering processing procedures); and (3) conventional concrete mixtures which are built into diverse products such as pavements, floor systems, etc. (instead of mortar mixes with very fine sand which are built into thin building panels). Due to the fact that we use conventional mixing techniques and mixing procedures, we need to emphasize the dispersion procedure of plant pulp fibers in our invention.

Processability has been an important issue addressed by some patents on fiber reinforced cement composites. U.S. Pat. No. 4,861,812 to McAlpin et al (1989) describes a modified polyolefin fiber with affinity towards aqueous system which facilitates its uniform dispersion in cement-based mixtures. This patent focuses on the use of modified polyolefin fibers as primary reinforcement, in relatively large volume fractions, in thin cement products. U.S. Pat. No. 4,310,478 to J. Baalslev and L. O. Masen (1982) describes a surface treatment method for adjusting the surface tension of thermoplastic fibers to facilitate the dispersion of such fibers, in relatively large volume fractions, as primary reinforcement in cement-based matrices. This patent focuses on thin cement products and specialized mix proportions and processing techniques. U.S. Pat. No. 4,968,561 to A. Mizobe et al (1990) introduces high-tenacity, coarse-denier synthetic (polyvinyl alcohol and polyacrylonitrile) fibers with a specific range of length-to-diameter ratio which are dispersible in fresh mortar and concrete mixtures. European patent No. EP-A-0235577 (1987) discloses agglomerates of fibers having improved dispersability in viscous organic or inorganic matrices, e.g. cement-based matrices, comprising acrylic staple fibers; the fibers do not damage fresh mix workability, and satisfactorily function as primary reinforcement for increasing the flexural strength and toughness of mortar and concrete. U.S. Pat. Nos. 4,483,727 and 4,524,101 to N. C. Elckman, W. Fabisiak and R. Dix (1984 and 1985, respectively) describe processing of high modulus polyethylene fibers into bundles of loosely adhering fibers which disperse readily at medium to high volume fractions in cement-based mixtures; the mixing action then separates the individual fibers from the bundles and provides for a uniform dispersion of fibers within the cement-based matrix. European patent EP-A-0225404 (1987) discloses a method of manufacturing a fiber reinforced molded cement body, which comprises dispersing strands consisting of a plurality of fibers into an unhardened cement material and thereafter hardening the material, at least some of the strands being impregnated with a binder so that the fibers of the strands are weakly bound to one another and so that, when the strands are dispersed in the cement material, the fibers are released from one another. The binder, e.g. an epoxy resin, is used in an amount such that the ratio of the strands to the binder is from 5:5 to 9:1 by volume. U.S. Pat. No. 5,399,195 to Hansen et al (1995) combines the concepts of processing synthetic fibers into bundles of loosely adhering fibers and adjusting the surface tension of synthetic fibers in application to fine polyolefin and polyester fibers in order to facilitate their dispersion in concrete mixtures as secondary reinforcement. U.S. Pat. Nos. 5,382,562 and 5,382,978 to R. E. Evans, A. Maranci and S. S. Kaminski (1994 and 1995, respectively) introduce crimped acrylic fibers which produce desirable rheological properties in fresh cement-based mixtures. Our invention is distinguished from the above efforts to disperse synthetic fibers in cement-based matrices because the distinct features of plant pulp fibers present processing issues which are quite different from those associated with synthetic fibers. While synthetic fibers are hydrophobic, plant pulp fibers are hydrophilic; plant pulp fibers also have much higher water absorption capacities than synthetic fibers. Hydrogen bonding of plant pulp fibers together (which is a blessing in paper production because it eliminates the need for adhesives in paper production with plant pulp fibers) complicates the dispersion of such fibers in conventional concrete mixtures using conventional mixing techniques where insufficient moisture and mixing effort is available to separate the individual plant pulp fibers from each other. This phenomenon of hydrogen bonding of fibers together is not present in synthetic fibers.

Modern Patents on the Use of Plant Fibers in Cement-Based Materials

Modern innovations and commercial activities relevant to plant fiber reinforced cement composites largely focus on the use of softwood kraft pulp as replacement for asbestos in thin cement products. In this application, Kraft pulp fibers are used at relatively large volume fractions (about 20%) in cement mixtures with relatively low dosages of very fine aggregates. In order to facilitate the dispersion of such high volume fractions of Kraft pulp fibers, excess amounts of water are used in the mix to form a fluid slurry; subsequently, the excess water is removed from the slurry using suction. The production process (referred to as Hatschek or slurry-dewatering) is highly specialized and is applicable only to controlled production facilities. The end products are in the form of thin-sheet products. U.S. Pat. No. 4,985,119 to K. D. Vinson and B. J. L. Huff (1991) describes a recent development in the use of softwood kraft pulp in slurry-dewatered thin cement products where the softwood kraft pulp has higher fractions of summerwood fibers than naturally occur in trees in order to provide a higher reinforcement efficiency. U.S. Pat. Nos. 4,369,201 and 4,400,217 to H. Kober (1983) also relate to the use of relatively high volume fractions of plant fibers for the replacement of asbestos in thin cement products manufactured using specialized processing techniques. Our invention is distinguished from the above patents and technologies because we use: (1) relatively low volume fractions of plant pulp fibers as secondary reinforcement (instead of high volume fractions of fibers as primary reinforcement); (2) conventional concrete mixtures which are built into conventional concrete products such as pavements, floor systems, etc. (instead of mortar mixtures with fine sand which are built into thin building panels); (3) conventional mixing techniques and equipment where the low intensity of the mixing effort and the shortage of moisture complicate the dispersion of plant pulp fibers (instead of specialized processing techniques such as the slurry-dewatering procedures which make excessive moisture and mixing effort available for the dispersion of fibers).

U.S. Pat. No. 5,453,310 to Andersen et al (1995) describes the use of relatively high volume fractions of natural (abaca) fibers in light-weight cement-based materials to render flexibility and toughness characteristics required from packaging materials. U.S. Pat. No. 4,263,365 to G. M. Burgess and R. M. Avery, Jr. (1981) describes the use of relatively high volume fractions of cellulose fibers in a foamed light-weight concrete mixture using specialized processing techniques involving the dispersion of fibers in a slurry with high water content. The cellulose fibers retain water and render fire resistance qualities; they also act as primary reinforcement to enhance the impact resistance and tensile strength of the foamed light-weight concrete. Our invention is distinguished from these technologies because we use; (1) relatively low volume fraction of plant pulp fibers as secondary reinforcement (instead of relatively high volume fraction of natural and cellulose fibers to function as primary reinforcement or retainer of moisture); (2) conventional concrete mixing techniques which lack the intensity, and the paste and moisture contents needed to effectively disperse fibers (instead of specialized processing procedures when using high volume fractions of fibers); and (3) conventional concrete mixtures which are built into conventional concrete products such as pavements, floor systems, etc. (instead of specialized mixtures which are built into precast products of relatively thin cross sections).

U.S. Pat. No. 5,196,061 to R. C. Thomas and C. O. Thomas (1993) describes mixing of the sludge from paper recycling mills with cement to produce useful building products. The cellulose fiber debris dispersed in the wet sludge bond to cement and provide the cured system with strength and integrity. Our invention is distinguished from this technology because we use: (1) plant pulp fibers (instead of a wet sludge with high moisture content in which cellulose fiber debris are incorporated during the paper recycling process); (2) conventional concrete mixtures with limited moisture content needed for effective dispersion of fibers, which are built into conventional concrete products such as pavements and floor systems (instead of cement mixtures without coarse aggregates which are built into individual precast units); and (3) conventional concrete mixing procedures and facilities which lack the intensity to effectively disperse fibers (instead of specialized processes and facilities which are applicable only to paper recycling sludge).

It is therefore an object of our invention to provide procedures for uniform dispersion of plant pulp fibers in conventional concrete mixtures using conventional mixing procedures and equipment.

It is another object and advantage of our invention to provide a low-cost and effective secondary reinforcement system for concrete consisting of relatively low volume fractions of uniformly dispersed plant pulp fibers which are compatible with and develop sufficient bonding to the concrete matrix.

It is a further object and advantage of our invention to provide reinforcing fibers for concrete which yield desirable fresh mix workability, segregation and bleeding resistance, pumpability, finishability and plastic shrinkage cracking resistance, and reduced rebound when pneumatically applied.

It is yet a further object and advantage of our invention to enhance the drying and thermal shrinkage cracking resistance, impact and abrasion resistance, fire resistance, toughness, and other mechanical, physical and durability characteristics of hardened concrete products with dispersed plant pulp fibers at relatively low volume fractions.

Still further objects and advantages will become apparent from a consideration of the ensuing description.

SUMMARY OF THE INVENTION

According to the present invention there is disclosed a method of providing concrete with an effective and low-cost secondary reinforcement system, comprising individualization of untreated or treated pulp fibers of about 0.1–30 mm in length, about 0.001–0.1 mm in diameter and having length-to-diameter ratios of about 30–3000, derived by at least one of chemical, mechanical or thermal means, or combinations thereof, from non-wood plants, wood plants and recycled paper products, with the individualization process reducing the bonding between fibers so that they can be dispersed in conventional concrete mixtures using conventional mixing equipment at relatively low dosages of about 0.3–30 kg per cubic meter. The affinity of individualized pulp fibers for water facilitates their dispersion in concrete. The fresh concrete mixtures incorporating dispersed plant pulp fibers possess desirable workability, resistance to segregation and bleeding, pumpability, finishability, resistance to plastic shrinkage cracking, and reduced rebound when pneumatically applied. The hardened concrete materials incorporating dispersed plant pulp fibers show improvements in cracking resistance, tensile and flexural strength, toughness characteristics, impact resistance, abrasion resistance, and other mechanical, physical and durability characteristics when compared with plain concrete. These improvements result from the fine and slender geometry and desirable mechanical, physical and durability characteristics of plant pulp fibers and their compatibility with concrete, and are achieved at relatively low cost due to the cost-competitiveness of plant pulp fibers. Precast and cast-in-place as well as reinforced and plain concrete and shotcrete benefit from such improvements in fresh and hardened material properties.

DETAILED DESCRIPTION OF THE PREFERRED EMBODIMENTS

Plant pulp is derived from wood or non-wood plants through pulping processes which use mechanical, thermal and/or chemical means (M. J. Kocurek and C. F. B. Stevens, "Pulp and Paper Manufacture—Vol. 1: Properties of Fibrous Raw Materials and Their Preparation for Pulping" The Joint Textbook Committee of the Paper Industry, 1983, 182 pp.). Examples of plant pulp include kraft, sulfite, mechanical, thermomechanical, chemi-thermomechanical, and combinations thereof. Recycling of paper also yields the pulp originally used in the production of paper. Both non-wood and wood plants may be used as the raw materials in the pulping process. Softwood and hardwood trees are popularly used in the production of pulp for use in paper products. Softwood pulp fibers are typically from about 2 to 10 mm in length and from about 0.01 to 0.1 mm in diameter. Hardwood fibers are typically from about 0.5 to 6 mm in length and from about 0.005 to 0.05 mm in diameter. The characteristics of pulp fibers vary within and between species. Plant pulp fibers are originally hollow, and they may collapse in the pulping process. The typical structure of pulp fiber consists of layers comprising fibrils wound in different inclinations; the fibrils themselves are assemblages of microfibrils. The key constituents of plant pulp are cellulose, hemicellulose and lignin. Some pulping processes (particularly chemical processes) remove some of these constituents (especially lignin) to different extents. Bleaching of pulp further removes some of these constituents. The surface of plant pulp constitutes hydroxyl groups which act as sites for hydrogen bonding. The conventional pulping processes which produce plant pulp for the paper industry yield suspensions of pulp fibers at low concentrations in water, which are subsequently dewatered through pressing and dried by heating. This process leads to hydrogen bonding of plant fibers to each other. The paper industry re-disperses this pulp in large amounts of water at low concentrations using the required mechanical (disintegration) effort, and then processes the pulp fibers to effectively bond to each other in the form of paper. Hence, hydrogen bonding of pulp fibers together is essential for the production of paper. The paper industry may also modify the pulp to adjust some of its properties. For example, the pulp may be sized to enhance its moisture resistance. The diaper industry is another major consumer of plant pulp fibers. This industry individualizes the pulp using hammer mill or pin mill to utilize its absorption characteristics. In order to facilitate this process, the pulp industry may individually dry the fibers to reduce their bonding together, which yields fluff pulp in lieu of paper pulp. The pulp industry may further reduce the bonding of fibers together by surfactant application, producing softened fluff pulp, which is even easier to individualize using, say, a pin mill. There are also other chemical means of producing bulky masses of pulp with reduced bonding of individual fibers to each other; an example is the use of high bulk additives together with individual drying which yields a fluffy pulp with high bulk.

Conventional mixing of concrete in ready-mixed concrete trucks, central mixers and different forms of rotary drum, pan, continuous and mortar mixers (P. K. Mehta and P. J. M. Monterio, "Concrete Structure, Properties, and Materials," Prentice Hall, 1983, 548 pp.) lacks the intensity and the amount of water needed to effectively separate and disperse the hydrogen-bonded plant pulp fibers, or even the individually dried (fluff) pulp fibers, or the individually dried pulp which has been subjected to surfactant (softened fluff pulp). Consequently, if the pulp which is produced for the paper and diaper industries is added to concrete, it tends to be coated with the wet cement paste but does not break down into individual fibers which would be uniformly dispersed in the fresh concrete mix.

The first step in our invention is to transform the paper pulp or the fluff pulp into individual fibers which can be dispersed in conventional concrete mixtures using conventional mixing techniques and equipment. This process of deriving individual fibers from pulp may be either dry or wet. The dry process uses mechanical action to separate the bonded fibers from each other. This mechanical action can be applied using a hammermill, a pin mill, or by other mechanical means. One may also use a high-speed air stream which carries the pulp and impacts it on a solid surface to break down the pulp into individual fibers. The wet process uses a blending (disintegrating) action in water to provide the effort needed to separate the fibers; the presence of sufficient water, at a binder concentration of about 1% to about 50% by weight, which penetrates into the pulp mass helps reduce the hydrogen bonding of fibers and thus facilitates the separation of fibers as far as sufficient blending intensity is utilized. Subsequent to the wet process, the individualized fibers may be partially dewatered to a moisture content as low as about 30% through pressing and/or heating to reach a minimum moisture content which mitigates the bonding of individualized fibers to each other. The end result of both dry and wet processes is in the form of individualized plant pulp fibers. The individualization process may also be built into the pulping process; currently the pulp industry resorts to individual drying, surfactant application and chemical means such as "high bulk additive" to individualize fibers; while these processes are not currently designed to produce individualized fibers which are dispersible in conventional concrete, they can be conceivably tailor-made to do so. Even if the degree of individualization is not quite sufficient, still further individualization of fibers may be achieved by the mechanical action of dry mixing of fibers with dry aggregates in conventional concrete mixers prior to the addition of the other mix ingredients. Alternatively, waste paper may be used as the source of plant pulp fibers. The waste paper may be subjected to the wet recycling processes commonly used in paper plants; this wet process yields pulp which can be subsequently processed for addition to concrete following the above wet or dry individualization procedures. The waste paper may also be subjected to dry recycling which yields individualized fibers blended with the other constituents of paper (clay, etc.). The pulp fibers resulting from the wet or dry processes of recycling could be damaged and shortened to different extents.

The individualized fibers obtained by dry or wet processing of virgin or recycled pulp or by dry recycling of waste paper can be added to conventional concrete mixtures comprising cement, water, fine aggregate, coarse aggregate and optionally various admixtures. The available moisture content of concrete and the mixing efforts rendered by the conventional mixing procedures and systems would be sufficient to uniformly disperse the individualized fibers in concrete. A conventional concrete mixture has about 50 to about 1500 kg per cubic meter of cement, about 50 to about 1000 kg per cubic meter of water, about 50 to about 1800 kg per cubic meter of fine aggregate with a maximum size of about 0.5 to about 5 mm, about 50 to about 1800 kg/cubic meter of coarse aggregate with maximum size of about 10 mm to about 100 mm, and chemical, mineral, polymeric and other admixtures as well as other fibers at conventional dosages. The individualized pulp fibers are added to concrete at dosages from about 0.3 to about 30 kg per cubic meter, and preferably from 0.5 to 5 kg per cubic meter. The aggregates could be natural, crushed stone, or other forms of artificial or natural normal-weight, light-weight or heavy-weight aggregates. The cement could be any hydraulic cement including Portland cement Types I through V, blended cement, high-alumna cement, magnesium phosphate cement, masonry cement, block cement, set regulated cement, Portland oil-well cement, and expansive cement. Conventional mixing equipment including ready-mixed concrete trucks, inclined rotary drum mixers, continuous mixers, pan mixers, and mortar mixers could be used in the processing of concrete mixtures incorporating plant pulp fibers. The invention can be applied to booth pre-cast and cast-in-place concrete production schemes. The end concrete products may or may not incorporate other forms of continuous or discrete reinforcement. Either dry or wet individualized pulp fibers can be added to concrete at any stage during mixing. For example, the individualized pulp fibers could be added at the end of the mixing process when all other ingredients have been mixed; the addition of fibers followed by the continuation of mixing would disperse the fibers. Alternatively, the fibers could be added early on or at any other step in the mixing process, before or after the addition of water. The pulp fibers could be dispersed in the mixing water of concrete and then delivered to the concrete mix in the mixing water. The individualized pulp fibers could also be added to other mix ingredients such as aggregates for delivery into the mix. The fibers could also be individualized in either wet or dry processes together with cement or aggregates. The individualize fibers may be emptied from a container into concrete or the container itself, particularly in the case of dry individualized fibers, may be water dissolvable or water dispersible so that the individualized fibers can be added to concrete together with the container. The affinity of plant pulp fibers for water facilitates complete separation and uniform dispersion of the fibers in fresh concrete mixtures using conventional mixing procedures and systems. The processes of wet or dry individualization of pulp fibers may be accomplished as a separate step which yields the individualized fibers to be supplied to the concrete industry; or alternatively, the wet or dry individualization step may be accomplished by the concrete industry together with the other steps involved in the preparation of concrete mixtures. The fresh concrete mixtures incorporating fibers can then be handled, pumped, shot (pneumatically in shotcrete applications), placed, consolidated, finished and cured using the same procedures and equipment applicable to conventional concrete mixtures. In dry shotcrete applications, where a dry mix is prepared and water is added to this dry mix during pneumatic application, the pulp fibers could be preferably dispersed in the water prior to addition to the dry mix. The individualized fibers could also be blended with the dry mix prior to the addition of water.

Plant pulp fibers consist of fibrils; fibrillatin, also called beating or refinement, is a wet mechanical process which exposes the fibrils on the fiber surfaces and also partly cuts, splinters and flexibilizes the plant pulp fibers. Fibrillation is popularly used by the paper industry; the exposed fibrils on the fiber surfaces provide for added mechanical interlocking and bonding of fibers in concrete mixtures; there is an optimum level of fibrillation which enhances the reinforcement efficiency of plant pulp fibers in concrete. The fibrillation process can be used as a replacement for the wet process of individualization of pulp fibers. Alternatively, the fibrillized fibers may be dried and then subjected to the dry individualization process. It should be noted that either the dry or wet process of individualizing the fibers renders, to a limited extend, the fibrillation effects to plant pulp fibers.

The end product of individualization and mixing of plant pulp fibers in concrete, after curing of concrete, is a hardened concrete material within which individual fibers are uniformly dispersed. The affinity of plant pulp fibers for water facilitates the transfer of cement particles, which are dispersed in water, to the vicinity of fibers and provides for dense interface zones. The relatively small diameter of fibers which is of the same order of magnitude as cement particle size also does not disrupt the development and spatial distribution of cement hydration products which is not the case with larger-diameter fibers. The fact that plant pulp fibers provide sites for hydrogen bonding leads to the formation of hydrogen bonds between the pulp fibers and the cement-based matrix if concrete is relatively dry. This bonding favors the reinforcement effects of plant pulp fibers in concrete. When concrete gets saturated, the presence of moisture could reduce the hydrogen bonding of pulp fibers to concrete; however, the fact that plant fibers swell in the presence of moisture produces compressive stresses between the saturated fibers and concrete matrix which add to frictional forces resisting fiber pull-out from matrix. Hence, frictional bonding partly substitutes hydrogen bonding in wet conditions.

Individual plant pulp fibers have relatively small volumes. Hence, even the relatively small dosages recommended in this invention constitute a relatively large number of fibers per unit volume of concrete. For example, a dosage of 0.9 kg of softwood and hardwood pulps per cubic meter of concrete provides about 500 and about 4000 individual pulp fibers per cubic centimeter of concrete, respectively. At such close spacing, plant pulp fibers would be highly effective in arresting the propagation of microcracks in concrete. Such microcracks develop in concrete mixtures even prior to the application of any loads due to differential drying and thermal movements within concrete. Under load and environmental effects, it is the propagation of such microcracks which renders damage to concrete; the joining of such microcracks eventually leads to the cracking and failure of concrete. The arrest of microcracks by the closely space plant pulp fibers controls the process which leads to cracking and failure of concrete and provides concrete with improved response to external load and environmental effects. Once microcracks propagate and join each other under load and environmental effects, cracks form in concrete; plant pulp fibers are slender and long enough to bridge across such cracks and provide the pull-out resistance needed to prevent the widening of cracks under load and environmental effects. This furthers delays the failure of concrete under destructive load and environmental effects. The cracks bridged by a large number of plant pulp fibers can widen only if they debond and pull out or rupture the bridging fibers. Either of these processes, and particularly debonding and pull-out, consumes energy and adds to the toughness characteristics of concrete.

EXAMPLE 1

Preparation of Individualized Plant Pulp Fibers

The following plant pulp fibers were considered:

1. bleached softwood kraft pulp
2. bleached hardwood kraft pulp
3. fibrillated bleached softwood kraft pulp
4. fluff(individually dried) softwood kraft pulp
5. softened (surfactant-treated) fluff softwood kraft pulp
6. Chemi-thermomechanical softwood pulp The plant pulp fibers were individualized either in dry or wet conditions. Dry individualization of the plant pulp fibers was accomplished by feeding them through a hammer mill. Wet individualization of plant pulp fibers involved their dispersion in a fraction of the concrete mixing water using a blender at a fiber concentration of about 5%.

EXAMPLE 2

Dispersion into Concrete

The wet or dry individualized plant pulp fibers of Example 1 were added at a dosage of 1.125 kg of fiber per cubic meter of concrete to fresh concrete mixtures which were prepared in a rotary drum mixer. The mixer had a rotation speed of about 20 revolutions per minute, and the mixing process prior to the addition of fibers took about 10 minutes. The individualized fibers were added to the mix at once, and the mixing process was continued for 3 minutes. Satisfactory dispersion of fibers was achieved in all cases where dry or wet individualized fibers were used. The concrete mix used here had the following mix proportions: 325 kg per cubic meter of Type I Portland cement, 158 kg per cubic meter of water, 704 kg per cubic meter of fine aggregate (natural concrete sand), 1114 kg per cubic meter of coarse aggregate (crushed limestone with maximum particle size of 25 mm), and air entraining agent at 180 ml per cubic meter of concrete.

EXAMPLE 3

Performance of Fresh Concrete with Dispersed Plant Pulp Fibers

The fresh concrete mixtures of Example 2 incorporating dispersed plant pulp fibers at a dosage of 1.125 kg per cubic meter were judged based on finishability and segregation resistance, and were tested for slump (ASTM C143), inverted slump cone (ASTM C995), and air content (ASTM C231).

The addition of individualized plant pulp fibers to concrete at a dosage of 1.125 kg per cubic meter was judged to enhance the finishability and segregation resistance of fresh concrete mixtures.

The slump, inverting slump cone (isc), and air content test results are presented below; the fiber type numbers shown below are those used in Example 1. Air content is observed to be only slightly affected by the addition of fibers. While slump shows some reduction in the presence of fibers, inverted slump cone is only slightly affected which indicates that concrete mixtures incorporating individualized plant pulp fibers respond favorably to vibration for consolidation. It should be noted that a small inverted slump cone time is indicative of a better response of concrete to vibration in the consolidation process.

| fiber type | individualization process | slump (mm) | isc (sec) | air (%) |
| --- | --- | --- | --- | --- |
| none | none | 153 | 8.3 | 5.0 |
| 1 | dry | 82 | 7.7 | 4.0 |
| 1 | wet | 82 | 8.8 | 3.7 |
| 2 | dry | 146 | 4.7 | 4.5 |
| 3 | wet | 82 | 9.7 | 3.5 |
| 3 | dry | 102 | 7.3 | 4.0 |
| 4 | dry | 114 | 7.2 | 4.5 |
| 5 | dry | 108 | 5.3 | 3.0 |
| 6 | dry | 127 | 6.7 | 4.9 |

EXAMPLE 4

Performance of Hardened Concrete with Dispersed Plant Pulp Fibers

The fresh concrete mixtures of Example 3 with 1.125 kg per cubic meter of dispersed plant pulp fibers were molded and consolidated through external vibration for the performance of compression (ASTM C39), drop-ball impact (ACI committee 544) and fracture using three-point bend (RILEM TC89-FMT) tests. The compression specimens were cylinders 100 mm in diameter and 200 mm high. The impact test specimens were cylinders 150 mm in diameter and 50 mm high. The fracture test specimens were 100 mm×100 mm×457 mm prisms. Three compression, three impact, and three fracture test specimens were prepared from each mix.

The specimens were kept inside their molds under a wet burlap for 24 hours; they were then removed from molds and immersed in water for 14 days of moist curing. The specimens were subsequently air dried for 7 days and tested at 21 days of age. The test results are presented below. The fiber type numbers are those presented in Example 1. The flexural strength and fracture toughness values were calculated from the fracture test results. Fracture toughness was defined as the total area underneath the load-crack mouth opening displacement curve. Plant pulp fibers are observed to enhance the mechanical properties of concrete; all properties of concrete considered (compressive strength, flexural strength, fracture toughness, and impact resistance) are improved with the addition of 1.125 kg per cubic meter of plant pulp fibers.

| fiber type | individualization process | compressive strength (MPa) | flexural strength (MPa) | fracture toughness (N.mm) | impact to 1st crack (# of blows) |
| --- | --- | --- | --- | --- | --- |
| none | none | 29.1 | 3.26 | 2,020 | 5 |
| 1 | dry | 32.1 | — | — | — |
| 1 | wet | 31.8 | 3.97 | 2,440 | — |
| 2 | dry | — | — | — | — |
| 3 | wet | 31.0 | 4.32 | 2,560 | 8 |
| 3 | dry | 32.5 | 3.65 | — | 11 |
| 4 | dry | — | — | — | — |
| 5 | dry | — | — | — | — |
| 6 | dry | — | — | — | — |

Mortar and grout are similar to concrete except that they lack coarse aggregates and thus typically contain higher cement contents than concrete. Typical applications are in thinner products and placements. The individualized plant pulp fibers can be added to fresh mortar and grout mixtures following the same procedures described in the main embodiment of the invention, noting that the conventional mixers used with mortar and grout may be different from those used with conventional concrete. When compared with concrete, the typically high amounts of cement paste in mortar and grout facilitate the dispersion of comparable dosages of pulp fibers.

The pulping process is concluded with press-dewatering and heat drying of plant pulp fibers which produces the hydrogen-bonded pulp fibers for the paper industry. Alternatively, the pulp industry can individually dry the pulp fibers to reduce bonding of fibers together, thus producing "fluff" pulp for the diaper industry; application of surfactant and individual drying of pulp further produces "softened fluff" pulp with reduced bonding of pulp fibers to each other. The pulp industry also, through chemical and physical means, can produce bulky pulp fibers with even less fiber-to-fiber bonding ("high bulk additive" pulp). Our efforts to disperse into conventional concrete mixtures "fluff", "softened fluff" and "high bulk additive" pulps without dry or wet mechanical action to break fiber bonds were not fully successful. However, it is conceptually feasible for the pulp industry to produce pulp at relatively high bulk where the individualized fibers can be dispersed in conventional concrete mixtures using conventional mixing procedures. Introduction of chemical and/or physical refinements into the pulping process to yield pulp of high bulk could yield individualized fibers which are dispersible in conventional concrete mixtures using conventional mixing procedures.

Accordingly, it can be seen that we have provided procedures for the uniform dispersion of plant pulp fibers at relatively low volume fractions in conventional concrete mixtures using conventional mixing procedures and systems for effective improvement of the performance characteristics of concrete.

Although the description above contains many specificities, these should not be construed as limiting the scope of the invention but as merely providing illustrations of some of the presently preferred embodiments of this invention. Various other embodiments and ramifications are possible within it's scope. For example, while the invention emphasizes conventional concrete mixtures and conventional mixing procedures, the individualized pulp fibers can also be introduced into specialized cement-based mixtures which are produced using specialized mixing procedures and systems. Such specialized mixtures may incorporate other reinforcing systems. As another example, the object of dry or wet fiber individualization in this invention is to produce the level of individualization which is needed for the dispersion of plant pulp fibers in conventional concrete mixtures using conventional concrete mixing procedures and systems. If this level of individualization can be achieved by the pulp industry during the pulping process using refined and/or complementary processes, the resulting pulp could be directly added to concrete. One way to achieve this individualization of plant pulp fibers is to never fully dry them at the conclusion of the pulping process. Another way is to chemically and/or physically refine the pulping and drying process to achieve the individualization of fibers.

Thus the scope of the invention should be determined by the appended claims and their legal equivalents, rather than by the examples and the detailed description given above.

We claim:

1. A process for making a cellulose fiber reinforced cement-based material using cellulose pulp derived through at least one of mechanical, thermal and chemical pulping methods, the process comprising the steps of:

a. drying the wet cellulose pulp resulting from the pulping methods under conditions to achieve a dried fluff pulp with low fiber-to-fiber bonding therein;

b. mechanically separating the dried fluff pulp into substantially individual fibers by breaking the fiber-to-fiber bonds between the individual fibers;

c. adding the separated, substantially individual fibers to a cement-based material at a dosage ranging from about 0.3–30.0 kg per cubic meter, said cement-based material further including about 50–1500 kg per cubic meter of cement, about 50–1000 kg per cubic meter of water, and about 100–3600 kg per cubic meter of aggregate; and d. mixing the separated, substantially individual fibers into the cement-based material so as to disperse the fibers uniformly throughout the cement-based material.

2. The process of claim 1, wherein the separated, substantially individual fibers are added to the cement-based material at a dosage ranging from 0.5–5.0 kg per cubic meter.

3. The process of claim 1, wherein said addition step involves addition of the separated, substantially individual plant fibers with other components of the cement-based material at any stage during the mixing step.

4. The process according to claim 3, wherein the mixing of the separated, substantially individual fibers into the cement-based material exceeds 20 seconds.

5. The process according to claim 1, wherein said aggregate of said cement-based material comprises at least one of mineral, synthetic, metallic, and organic sources, with about 0.05–5 mm minimum aggregate particle size and about 10–100 mm maximum aggregate particle size.

6. The process according to claim 1, wherein said drying step limits pressing of the wet cellulose pulp to produce the dried fluff pulp with low fiber-to-fiber bonding therein.

7. The process according to claim 6, wherein said drying step further involves chemically treating the cellulose pulp to produce a dried, softened fluff pulp with low fiber-to-fiber bonding therein.

8. The process of claim 7, wherein said chemical treating involves use of at least one of a surfactant, a high bulk additive, and a sizing agent.

9. The process according to claim 1, wherein said mechanical separating step involves milling the dried fluff pulp.

10. The process according to claim 1, wherein said mechanical separating step involves fillibrating the dried fluff pulp.

11. The process according to claim 1, wherein said mechanical separating step involves carrying the dried fluff pulp in a high-speed airstream and impacting the airstream and pulp against a solid surface.

12. The process of claim 1, wherein said mechanical separating step involves wet processing of the dried fluff pulp with mechanical action.

13. The process of claim 1, wherein the wet cellulose pulp comprises waste paper products.

14. A process of claim 1, wherein said cement-based material is mortar with maximum aggregate particle size of less than about 5 mm.

15. A process of claim 1, wherein said mixing step involves mixing said separated, substantially individual fibers with at least one other dry ingredient of said cement-based material as a dry mix, and subsequently mixing the dry mix with the water and other ingredients of the mix.

16. The process of claim 1, wherein said mixing step involves mixing said separated, substantially individual fibers with the cement and the aggregate cement-based material as a dry mix, and subsequently mixing the dry mix with the water in a shotcrete process during pneumatic application of the dry mix.

17. The process of claim 1, wherein the adding step involves adding the separated, substantially individual fibers into the cement-based material together with a container therefor which disintegrates in the cement-base material through at least one of dissolution and dispersion.

18. The process according to claim 1, wherein said cement-based material further includes at least one of chemical admixtures, mineral admixtures, polymeric admixtures, and an air entraining agent.

19. The process according to claim 1, wherein said cement-based material is further subjected to at least one of the pumping, casting, consolidating, pneumatic application, and finishing processes.

20. A fresh concrete mixture incorporating dispersed cellulose pulp fibers, which is workable, pumpable, resistant to segregation and excess bleeding, possesses desirable finishability, and offers resistance to the loss of materials through rebound when pneumatically applied, the concrete mixture comprising:

0.3–30 kg per cubic meter of substantially individual cellulose fibers which have been derived from a wet cellulose pulp dried under conditions to achieve a fluff pulp with reduced fiber-to-fiber bonding therein, and subsequent, mechanical separation of the dried fluff pulp into the substantially individual fibers;

about 50–1500 kg per cubic meter of cement;

about 50–1000 kg per cubic meter of water;

about 100–3600 kg per cubic meter of aggregate; and wherein the substantially individual fibers are dispersed uniformly throughout the cement-based material through mixing for a sufficiently long period of time.

21. A fresh concrete mixture according to claim 20, wherein said mixture comprises 0.5–5.0 kg per cubic meter of the substantially individual cellulose fibers.

22. A fresh concrete mixture according to claim 20, further including at least one of chemical admixtures, mineral admixtures, polymeric admixtures, and an air entraining agent.

23. A fresh concrete mixture according to claim 20, wherein said cellulose fibers have lengths ranging from about 0.1–30 mm, diameters ranging from about 0.001–0.1 mm, and mean length-to-diameter ratios ranging from about 30–3000.

24. A fresh concrete mixture according to claim 20, wherein said drying conditions limits pressing of the wet cellulose pulp.

25. A fresh concrete mixture according to claim 20, wherein said drying conditions involve addition of a chemical to the cellulose pulp so that the fluff pulp is softened fluff pulp.

26. A fresh concrete mixture according to claim 25, wherein said chemical includes at least one of a surfactant, a high bulk additive, and a sizing agent.

27. A hardened cellulose fiber reinforced cement structure comprising:

about 0.3–30 kg per cubic meter of substantially individual cellulose fibers derived by initially drying a wet cellulose pulp under conditions to form a dried fluff pulp having low fiber-to-fiber bonding therein, and subsequently mechanically separating the dried fluff pulp into the substantially individual fibers;

about 50–1500 kg per cubic meter of cement;

about 50–1000 kg per cubic meter of water;

about 100–3600 kg per cubic meter of aggregate; and said substantially individual cellulose fibers being uniformly dispersed throughout the hardened structure through mixing of the fibers together with the cement, water and aggregate for a sufficient length of time prior to curing.

28. A hardened cellulose fiber reinforced structure according to claim 27, wherein the structure comprises 0.5–5.0 kg per cubic meter of the cellulose fibers.

29. The hardened cellulose fiber reinforced cement structure of claim 27, wherein said cellulose fibers comprise at least one of softwood and hardwood craft with lengths ranging from 0.1–30 mm, diameters ranging from 0.001–0.1 mm, and mean length-to-diameter ratios ranging from 30–3000.

30. The hardened cement structure according to claim 27, further including at least one of chemical admixtures, mineral admixtures, polymeric admixtures, and air entraining agents.

31. The hardened cement structure of claim 27, further including a gas-forming agent and air bubbles therein.

32. The hardened cement structure according to claim 27, further including at least one of continuous and discrete reinforcement in addition to the cellulose fibers.

33. The hardened cement structure according to claim 27, wherein said drying conditions limits pressing of the wet cellulose pulp.

34. The hardened cement structure according to claim 27, wherein said drying conditions involve addition of a chemical to the cellulose pulp so that the fluff pulp is softened fluff pulp.

35. The hardened cement structure according to claim 34, wherein said chemical includes at least one of a surfactant, a high bulk additive, and a sizing agent.

* * * * *